(12) United States Patent
El-Gebaly et al.

(10) Patent No.: US 7,328,240 B2
(45) Date of Patent: Feb. 5, 2008

(54) DISTRIBUTED MULTIPOINT CONFERENCING

(75) Inventors: Hani El-Gebaly, Beaverton, OR (US); Stephen Ing, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1127 days.

(21) Appl. No.: 09/896,521

(22) Filed: Jun. 28, 2001

(65) Prior Publication Data

US 2003/0005054 A1    Jan. 2, 2003

(51) Int. Cl.
*G06F 15/16* (2006.01)
*H04J 1/16* (2006.01)

(52) U.S. Cl. .................. 709/204; 709/328; 370/401; 370/216

(58) Field of Classification Search ........... 709/201, 709/204–206, 212, 213, 246, 227, 228, 245, 709/230, 326; 370/216, 260, 352, 338, 390; 348/14.11; 707/3, 10
See application file for complete search history.

(56) References Cited

U.S. PATENT DOCUMENTS

| | | | | |
|---|---|---|---|---|
| 5,555,298 A | * | 9/1996 | Jonsson | 379/210.01 |
| 5,566,171 A | * | 10/1996 | Levinson | 370/352 |
| 5,625,407 A | * | 4/1997 | Biggs et al. | 348/14.11 |
| 5,859,979 A | * | 1/1999 | Tung et al. | 709/228 |
| 6,047,184 A | * | 4/2000 | Haces et al. | 455/445 |
| 6,047,323 A | * | 4/2000 | Krause | 709/227 |
| 6,141,347 A | * | 10/2000 | Shaughnessy et al. | 370/390 |
| 6,157,401 A | * | 12/2000 | Wiryaman | 348/14.09 |
| 6,360,265 B1 | * | 3/2002 | Falck et al. | 709/227 |
| 6,424,994 B1 | * | 7/2002 | Pirich et al. | 709/205 |
| 6,697,349 B2 | * | 2/2004 | Mathis et al. | 370/338 |
| 6,731,609 B1 | * | 5/2004 | Hirni et al. | 370/260 |
| 6,738,343 B1 | * | 5/2004 | Shaffer et al. | 370/216 |
| 6,754,224 B1 | * | 6/2004 | Murphy | 370/432 |
| 6,934,702 B2 | * | 8/2005 | Faybishenko et al. | 707/3 |
| 7,079,495 B1 | * | 7/2006 | Pearce et al. | 370/260 |

OTHER PUBLICATIONS

SIP: Session Interface Protocol, Network Working Group RFC 2543, Bell Labs Mar. 1999, Copyright (C) The Internet Society (1999).

* cited by examiner

*Primary Examiner*—David Wiley
*Assistant Examiner*—Jude J Jean-Gilles
(74) *Attorney, Agent, or Firm*—Grossman, Tucker, Perreault & Pfleger, PLLC (57) ABSTRACT

Facilitating a distributed multipoint conference using, for example, the ITU-T H.323 protocol may involve establishing a connection (e.g., that supports a unicast stream) between multiple endpoints, including at least a requesting endpoint and one or more other participating endpoints, and initiating a connection from the requesting endpoint to at least a third endpoint. The requesting endpoint identifies to the third endpoint the one or more other participating endpoints. A connection is established between the third endpoint and the one or more other participating endpoints identified by the requesting endpoint. The third endpoint identifies the requesting endpoint to the one or more other participating endpoints. At each of the endpoints, unicast streams received from each of the other participating endpoints may be mixed to form a logical multipoint conference.

25 Claims, 5 Drawing Sheets

DISTRIBUTED MULTIPOINT CONFERENCING

BACKGROUND

The present application relates to systems and techniques for distributed multipoint conferencing, for example, such as used in Internet-based voice- or video communications. Communicating voice and/or video data over a packet-switched computer network using Internet Protocol (IP) is referred to as "IP telephony." IP telephony enables participants (e.g., human users) to conduct teleconferences or video-conferences over the Internet without having to use the Public Switched Telephone Network (PSTN).

Telecom Standard H.323 of the International Telecommunication Union (ITU-T) serves as an umbrella for a set of standards for IP telephony, or more generally, for real-time multimedia communications over packet-switched networks. The standards under the H.323 umbrella define a set of call control, channel setup and coder-decoder (codec) specifications for transmitting real-time voice and video over networks that do not offer guaranteed service or quality of service—such as packet networks, and in particular Internet, Local Area Networks (LANs), Wide Area Networks (WANs), and Intranets.

Details of one or more embodiments are set forth in the accompanying drawings and the description below. Other features, objects, and advantages will be apparent from the description and drawings, and from the claims.

DETAILED DESCRIPTION

An IP telephone call basically has two components—a signaling connection and a media (e.g., voice or video) stream. For H.323 calls, the signaling connection can be established using ITU-T standards H.245 and Q.931—parts of the H.323 umbrella that specify the in-band signaling protocol necessary to establish a call, determine capabilities of the participating terminals, and issue the commands to open and close the logical media channels. Once the signaling connection has been established, the participating endpoints can exchange data streams with each other using either a unicast (point-to-point, or one-to-one) stream or a multicast (one-to-many) stream.

Figure 1A:
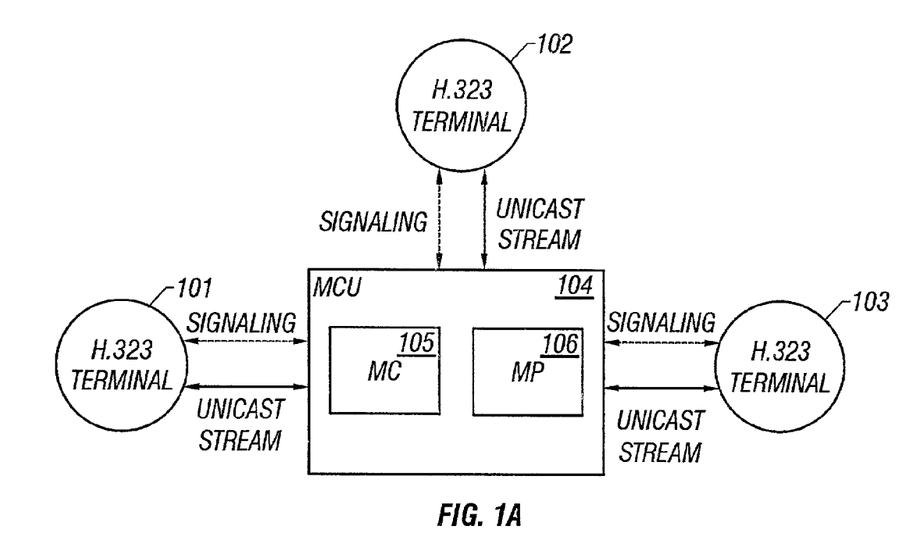
FIGS. 1A and 1B are block diagrams of centralized H.323 conference and a distributed H.323 conference respectively.

A multipoint IP telephony conference involves three or more participating endpoints (e.g., terminals or workstations). In general, H.323 supports two different types of multipoint conferencing: centralized conferencing and decentralized conferencing. As shown in FIG. 1A, H.323 centralized multipoint conferencing involves three or more endpoints—H.323 terminals 101-103—that exchange voice or video data with each other through a central node—namely, the Multipoint Control Unit (MCU) 104, which in turn includes a Multipoint Controller (MC) 105 and a Multipoint Processor (MP) 106. The MP 106 receives a unicast stream (e.g., voice and/or video data) from each of the terminals 101-103, mixes the streams, and redistributes the mixed stream to each of the endpoints so that each endpoint can hear or see the respective media stream from each of the other endpoints participating in the conference. However, before the unicast streams can be transmitted and then mixed by the MPU 106, the MC 105 first uses signaling channels to set up respective connections with each of the terminals 101-103 and to establish media channels for their unicast streams. Signaling between the MC 105 and the terminals 101-103 is based on ITU-T H.245.

Figure 1B:
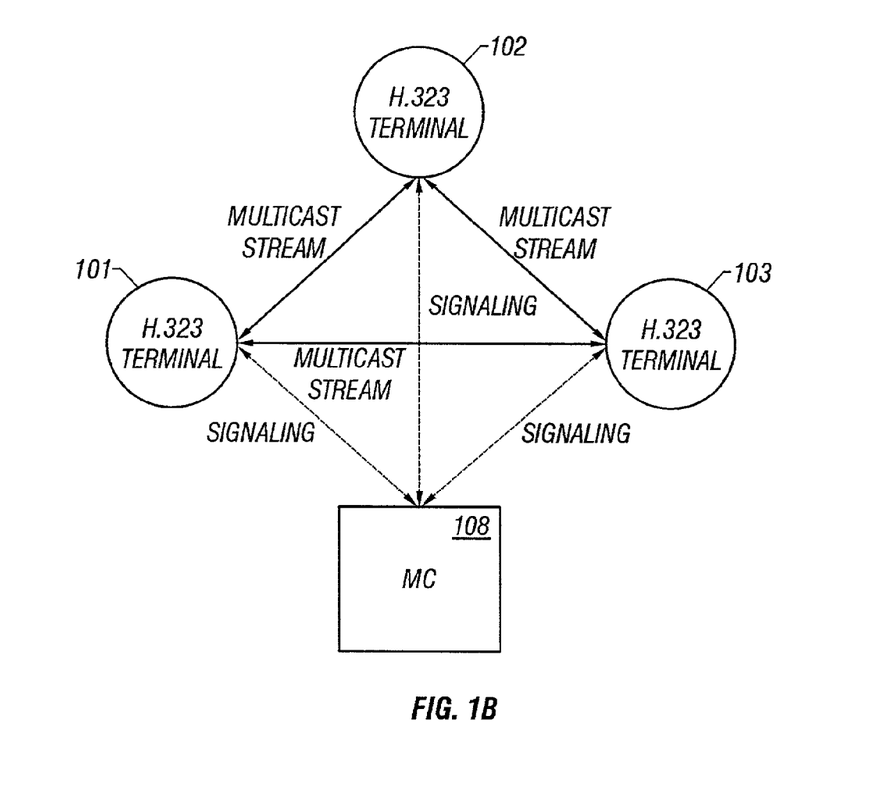

As shown in FIG. 1B, H.323 decentralized multipoint conferencing differs from H.323 centralized multipoint conferencing primarily in that, rather than using MP 106 to collect, mix and redistribute all of the media streams, the media stream from each of the terminals 101-103 is sent directly to each of the other participating terminals using a multicast protocol. For example, terminal 101 multicasts its media stream to each of terminals 102 and 103, terminal 102 multicasts its media stream to each of terminal 101 and 103, and so on. Each participating terminal is responsible for mixing the received media streams into a single conference. As shown in FIG. 1B, H.323 decentralized multipoint conferencing uses an MC 108 to serve as a central signaling controller. Although shown as a separate component in FIG. 1B, the MC 108 alternatively could be within one of the terminals 101-103.

Figure 2:
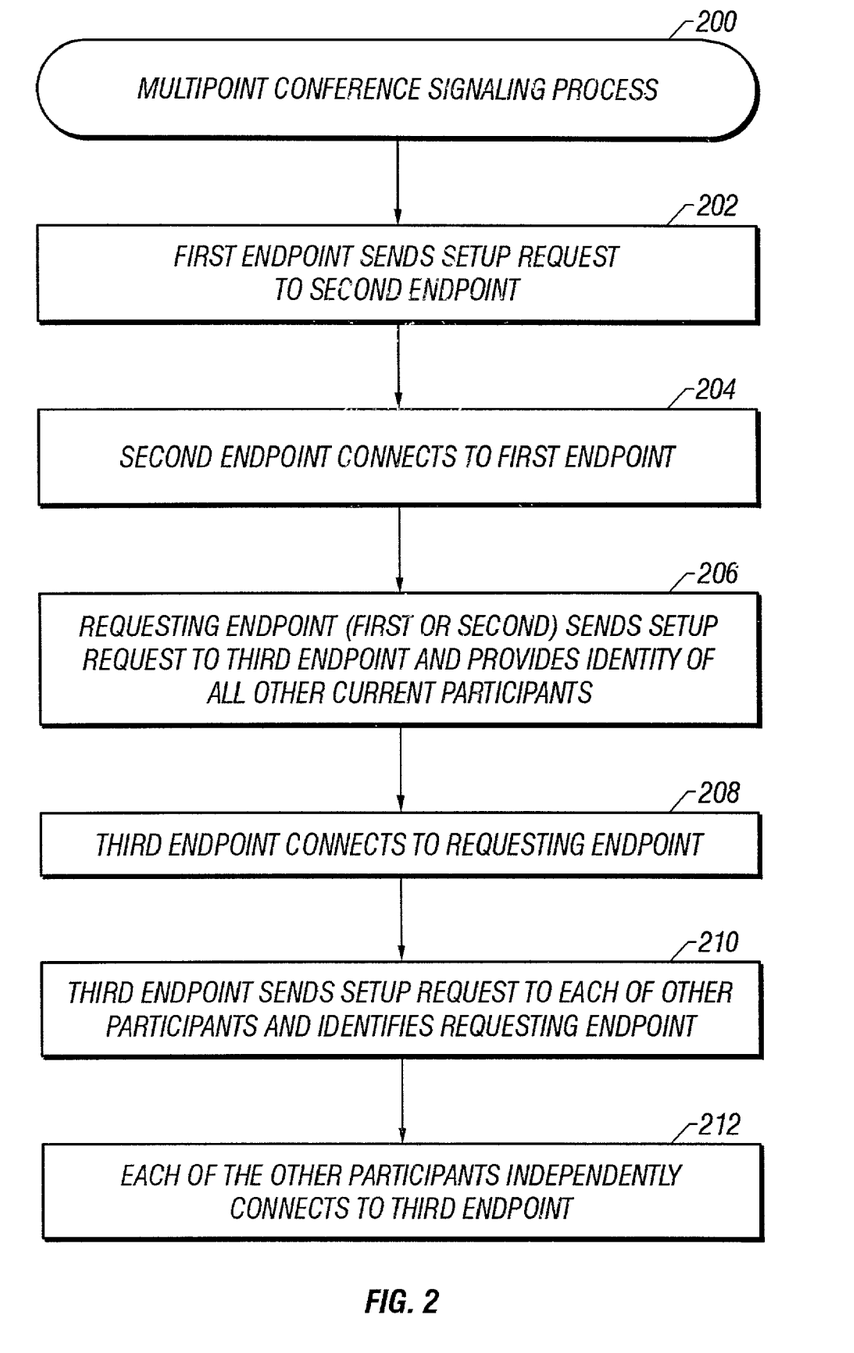
FIG. 2 is a flowchart of a signaling process for setting up a multipoint conference.

FIG. 2 is a flowchart of an example of a signaling process for setting up a distributed multipoint conference among three or more endpoints without requiring centralized control either for signaling or for mixing media streams. As shown in FIG. 2, the process starts with a first endpoint (e.g., an H.323 terminal) sending a call setup invitation to a second endpoint (e.g., another H.323 terminal connected via a WAN or LAN) to initiate a connection between the two endpoints (202). The first endpoint may send the invitation in response to a human user's actions at the first endpoint, for example, entering into a user interface of an IP telephony client (a end-user, clientserver-based software application such as Intel Internet Phone that emulates telephone functionality) a number or other input identifying the second endpoint as a call destination. In response to the invitation, the second endpoint connects to the first endpoint to establish a connection to facilitate unicast streaming between them (204). The second endpoint may connect with the first endpoint in response to a human user's actions at the second endpoint, for example, indicating in an IP telephony client acceptance of the incoming call from the first endpoint.

Next, if, for example, a human user at either the first or second endpoint decides to patch in another conference participant (e.g., a third endpoint), that user can perform appropriate actions on an IP telephony client, for example, to enter the third endpoint's number. In response, the requesting endpoint (i.e., either the first or second endpoint depending on which is initiating the patching in of the third participant) sends a request to a third endpoint to initiate a connection between the requesting endpoint and the third endpoint and further transmits information that identifies the other conference participants (206). For example, assuming that the second endpoint is the requesting endpoint, the second endpoint transmits to the third endpoint a request to setup a connection and information indicating that the first endpoint also is a conference participant. In response, the third endpoint connects to the requesting endpoint to establish a connection between them (208).

Continuing the assumption that the second endpoint initiated-the connection request to the third endpoint, at this stage in the process, two connections have been established among the three endpoints: one connection between the first and second endpoints and another connection between the second and third endpoints. To complete the conference, a connection needs to be established between the third and first endpoints and the three connections need to be logically associated with each other so that each participating endpoint will know to mix the respective streams to form a single three-way conference.

Accordingly, based on the identities of the other participating endpoints provided by the requesting endpoint, the third endpoint sends an invitation to each of the other participating endpoints to establish a connection and further transmits the identity of the requesting endpoint (210). In the above example, the third endpoint would send an invitation to the first endpoint and would further transmit information identifying the second endpoint as the requesting endpoint.

Finally, each of the conference participants to whom the third endpoint sent an invitation in 210 (in the above example, only a single—namely, the first—endpoint) independently responds with signaling information that establishes a connection with the third endpoint (212). At this stage in the process, each of the participating endpoints (first, second and third) has a connection established with each of the other endpoints in the conference. Moreover, each of the participating endpoints knows the identities of the other participating endpoints and thus knows which unicast streams are to be mixed and treated logically as a single conference. For example, the second endpoint knows that all data received over the connections from the first and third endpoints is to be mixed and provided to the user of the IP telephony client at the second endpoint as a unitary stream. Similarly, the second endpoint further knows that all input received from the user of the IP telephony client at the second endpoint is to be sent in multi-unicast fashion over both of the connections to the first and third endpoints, each of which will then perform mixing locally.

In the case of voice-conferencing, mixing typically involves combining two potentially interfering audio streams and presenting the combined stream to the user. In the case of video-conferencing, however, the video portions of the respective media streams likely would not be overlaid to form a composite video but rather would be presented to the user at the second endpoint in separate display regions.

Virtually any number of additional participants can be added to the conference by repeating 206-212. Stated more generally, this technique can be repeated as desired to support N-way conferencing among N endpoints, where N is an integer greater than two. Any currently participating endpoint can serve as the initiating, or requesting, endpoint to add another participant.

The signaling process of FIG. 2 may provide several advantages. For example, it may facilitate distributed multipoint conferences between terminals without requiring any centralized control either for signaling or for mixing or otherwise processing media streams. In particular, distributed multipoint conferences may be conducted without the need for an MCU, MC or MP, which consequently simplifies network design and A maintenance. The absence of the MCU, MC and MP further may tend to reduce communication latency because communicating directly among the conference participants, rather than through a central entity, may minimize the number of network "hops" required to collect, mix and redistribute the media streams.

Further, the process of FIG. 2 may facilitate multipoint conferencing without any additional infrastructure requirements and, in particular, potentially while avoiding the use of multicast streaming, which is not universally supported. Rather, the endpoints participating in the conference may communicate with each other through a set of connections that are logically related to collectively form the conference. This configuration—referred to here as "multi-unicast"—is universally supported and is more easily implemented than multicast protocols.

The flowchart of FIG. 2 is an example of a conference set-up process. Other processes that include different or additional procedures may be used instead while still providing one or more of the advantages discussed here. Generally, the procedures depicted are order-independent and, depending on context, may be performed serially or substantially in parallel. Moreover, the distributed multipoint conference set-up process may be implemented using the H.323, Q.931 and/or H.245 protocols, or different or additional protocols, depending on the objectives and parameters of the system's designers, administrators, and/or users.

Figure 3A:
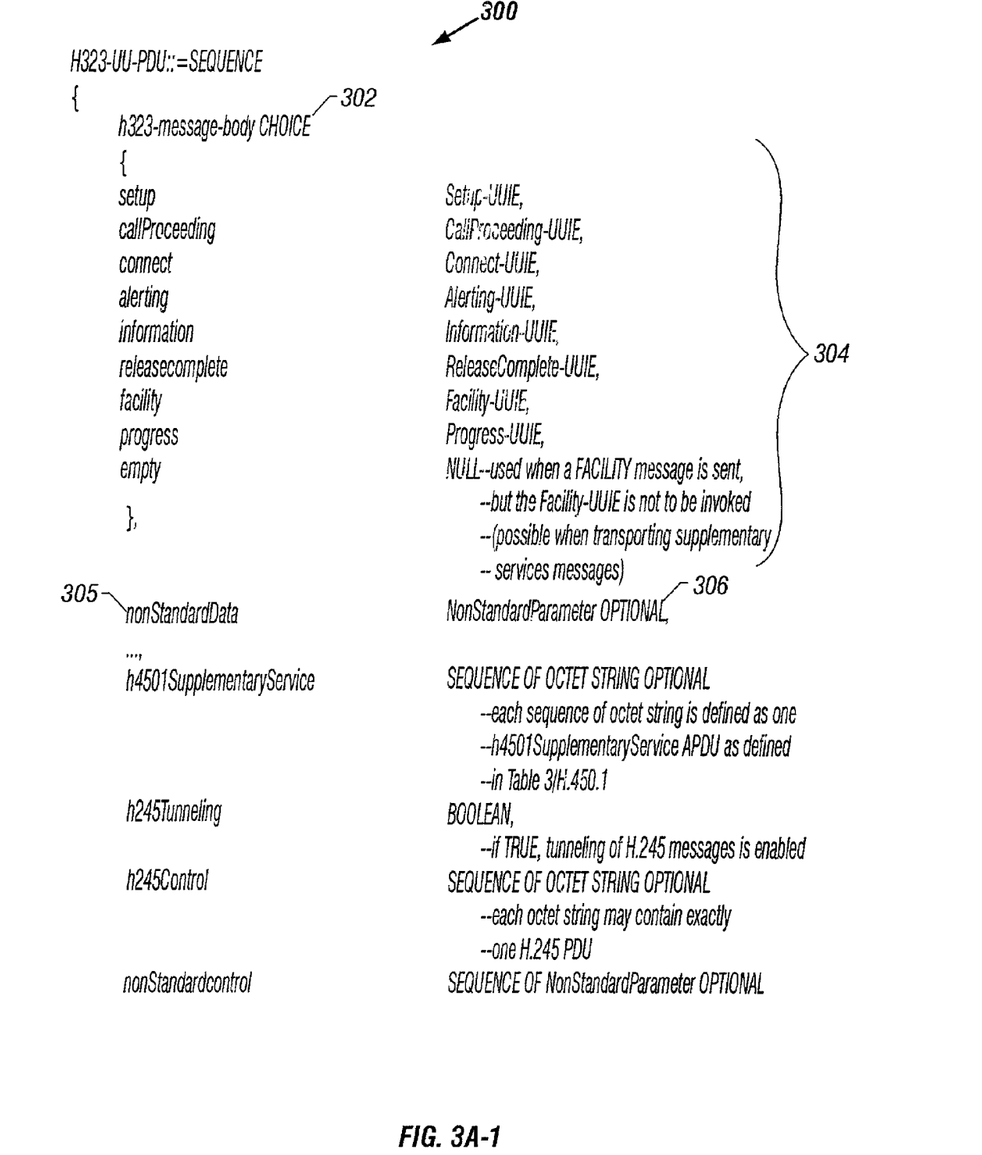
FIGS. 3A and 3B show an example of a modified H.323 setup message.
Figure 3A:
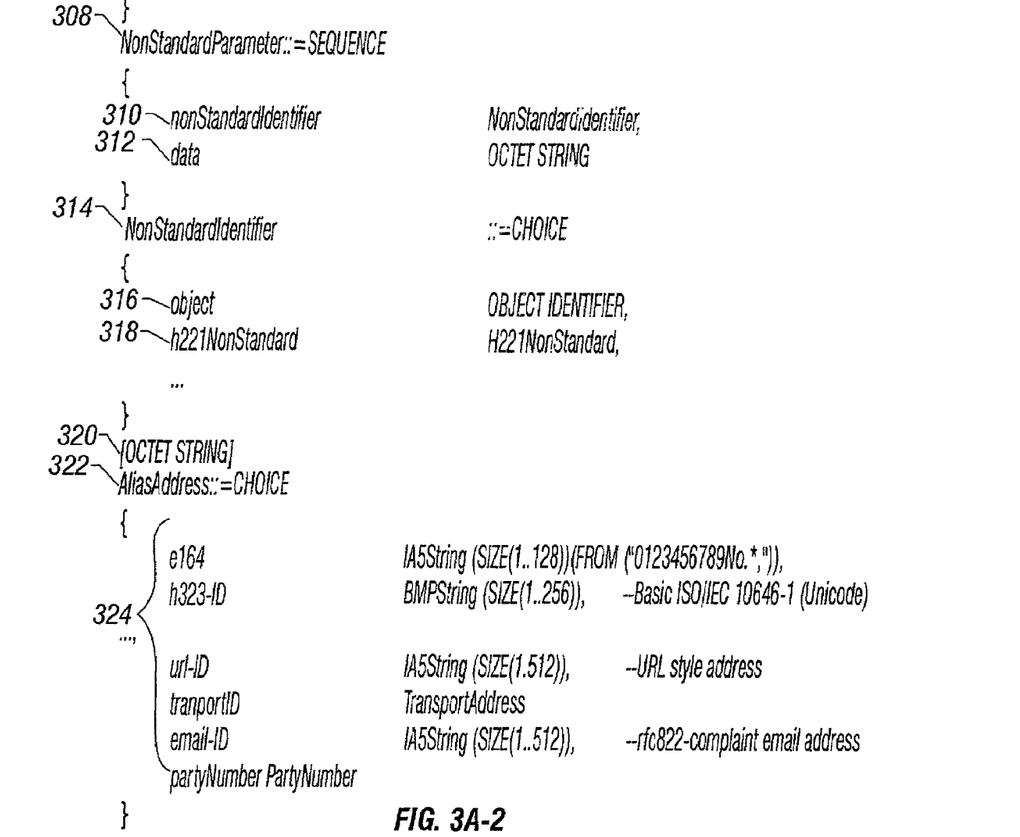
Figure 3B:
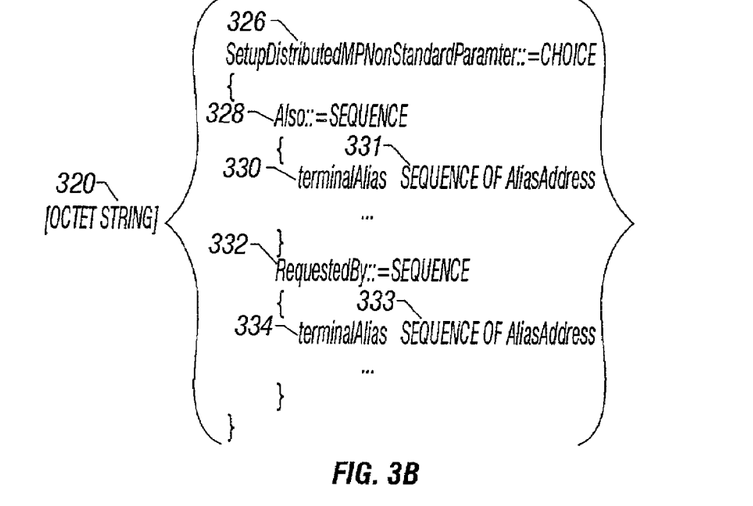

FIGS. 3A and 3B together show an example of an H.323 setup message format that enables three or more H.323 terminals to establish a distributed multi-unicast multipoint conference without the use of a MCU, MC or MP. FIG. 3A shows the format of a standard H.323 PDU (Protocol Data Unit) message for setting up and maintaining connections between H.323 terminals. As shown therein, the PDU message 300 is composed of a message-body of one of the nine available message types 304 (setup, callProceeding, connect, alerting, information, releasecomplete, facility, progress, and empty).

The message format 300 also includes a nonStandardData field 305 in which an optional NonStandardParameter 306 can be specified, for example, to communicate information that is outside of the H.323 standard. Essentially, this field serves as an extensible hook that system designers can use to implement functions that are not natively supported by H.323. When the NonStandardParameter field 306 is used, the message 300 further specifies a nonStandardIdentifier 310 and data 312, in the form of a string of octets (eight-bit units), associated with the specified nonStandardIdentifier 310. The nonStandardIdentifier 310, which is used to determine the identity of the endpoint that is sending the nonstandard data, further is specified in the message format 300 to be either an object 316 or h221NonStandard.

When non-standard data is being communicated, the data is inserted in the form of octet strings at a field 320 in the message format 300. An example of a data format that may be used for the octet string 320 is shown in FIG. 3B. As shown therein, to facilitate the setup of distributed multipoint multi-unicast H.323 conferences, the octet string field 320 may take the form of a structure SetupDistributedMP-NonstandardParamter 326 that, depending on context, specifies one of two different parameters: Also 328 or RequestedBy 332.

The Also parameter 328 is used in the context of 206 in FIG. 2—that is, by an H.323 terminal currently participating in the conference ("the requesting endpoint") to identify in a setup message to an H.323 terminal being invited to join the conference ("the joining endpoint") the identities of one or more other endpoints participating in the conference. Specifically, the Also parameter 328 would include a sequence 331 of one or more terminalAliases 330 (identities of endpoints) corresponding to the endpoints that already are participants in the conference. The terminalAlias parameter 330 can take any of the values shown in the list 324, for example, an H.323 identifier, a URL (universal resource locator) address, an email address, etc.

The RequestedBy parameter 332 is used in the context of 210 in FIG. 2—that is, RequestedBy 332 is included in a setup message sent by the joining endpoint to inform each of the endpoints specified by the sequence 331 of the identity of the requesting endpoint. Specifically, the RequestedBy parameter 332 would include a sequence 333 of one or more terminalAliases 334 corresponding to the requesting endpoint. Typically, the terminalAlias sequence 333 would include only a single alias corresponding to the requesting endpoint. However, depending on the specific implementation and context, the sequence 333 could include two or more aliases corresponding to the requesting endpoint, for example, a telephone number alias, an email alias, an administrative alias, or the like.

Typically, SetupDistributedMPNonStandardParamter 326 would be included in "Setup" type messages in order to set up distributed multi-point conferences. However, other implementations could use SetupDistributedMPNonStandardParamter 326 in other types of messages, e.g., "Facility" messages, to provide additional or different functionality for other calling situations.

Figure 4:
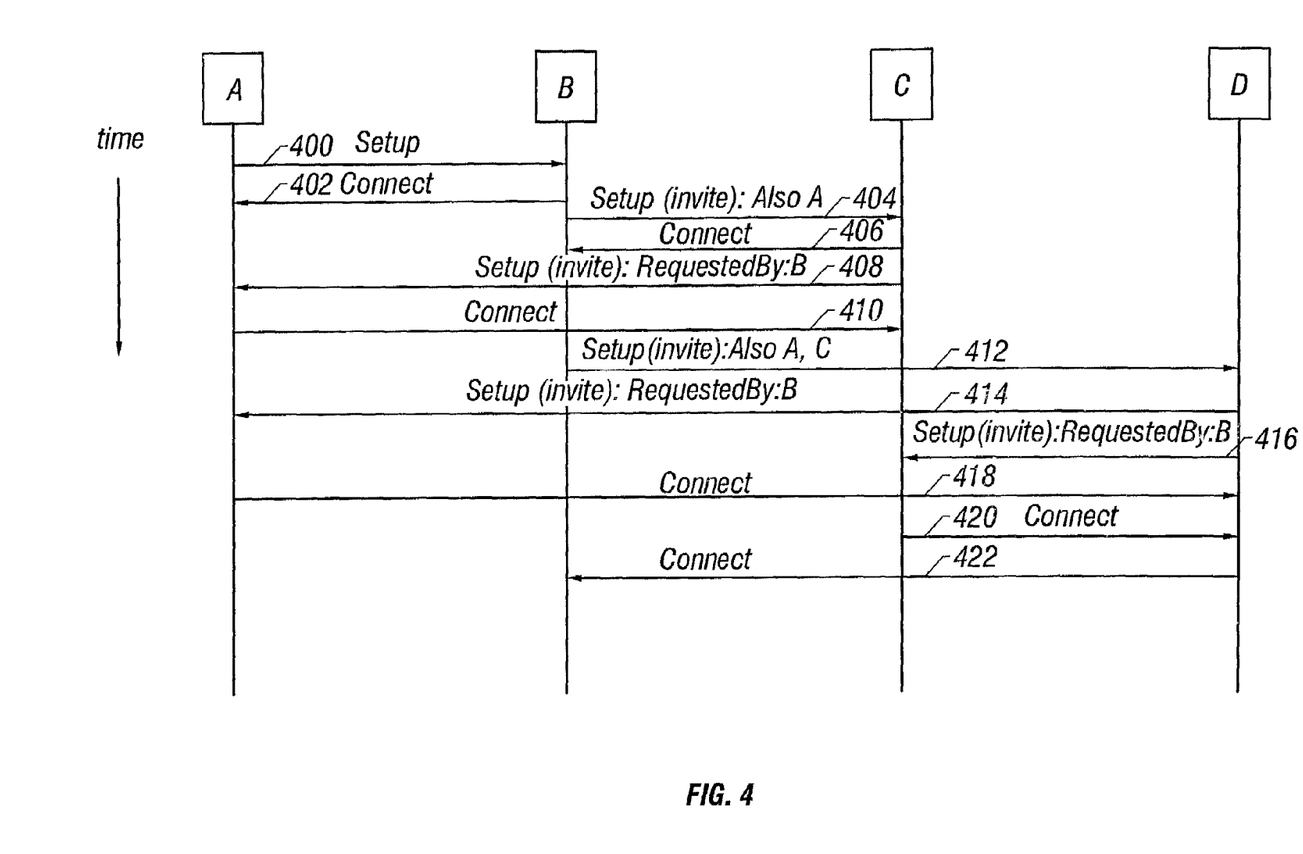
FIG. 4 is a railroad diagram showing an example of a sequence of operations during setup of a multipoint conference involving four endpoints—A, B, C and D.

FIG. 4 is a railroad diagram that shows an example of a sequence of events that can be used to establish a distributed multi-unicast H.323 multipoint conference among four endpoints: A, B, C, and D. In this example, endpoint A first requests a signaling channel from endpoint B and, when established, sends an H.323 setup request message to endpoint B to initiate a connection between them (400). Endpoint B responds by returning a connect message to endpoint A to establish the connection (402). The connection between endpoints A and B, as well as the connections discussed below among the other endpoints, optionally can be established using the "Fast Connect" procedure—a commonly used call procedure for establishing H.323 calls. Details of the Fast Connect procedure can be found in ITU-T Recommendation H.323, section 8.1.7. In general, the Fast Connect procedure enables the logical media channels to be specified in the setup/connection messages rather than having to use multiple H.245 channel messages to set up the logical media channels after connection of the call. Among other information, the Fast Connect procedure includes elements in the setup/connection messages that specify information about the address and port at which the media stream will be received.

At this point, assume that a user at endpoint B desires to establish a three-way conference by patching in a user at endpoint C. Accordingly, in response to user input, endpoint B requests a signaling channel with endpoint C and sends a setup request message requesting endpoint C to establish a connection with endpoint B (404). The setup message in this case includes the identity of endpoint A in the Also parameter to let endpoint C know with which other endpoints endpoint C should initiate a connection.

Endpoint C then responds with a connect message to endpoint B to establish a connection between them (406). Endpoints B and C also establish Realtime Transport Protocol (RTP) channels between them based on port information exchanged in the Fast Connect elements of the setup message sent from endpoint B to endpoint C in 404. RTP channels are used to communicate packets of streaming media/data between endpoints. RTP is described in Request For Comment (RFC) number 1889 (January 1996) of the Internet Engineering Task Force (IETF) (see http://www.ietf.org/rfc/rfc1889.txt).

Endpoint C further requests a signaling channel from endpoint A and sends a setup request message requesting endpoint A to establish a connection with endpoint C (408).

The setup request message in 408 sent from endpoint C to endpoint A includes the identity of the requesting endpoint (B) in the message's RequestedBy parameter to let endpoint A know that the connection being initiated by endpoint C should be treated as part of the same logical conference as the connection currently in place between endpoints A and B. Similarly, endpoint B knows that its two connections with endpoints A and C, respectively, should be treated as the same logical conference because endpoint B initiated the call to endpoint C with the express purpose of establishing a three-way conference. Endpoint C knows that its two connections with endpoints A and B, respectively, should be treated as the same logical conference based on the "Also A" parameter received from endpoint B.

In response to the setup request message received from endpoint C, endpoint A sends a connect message to endpoint C to establish a connection between them (410). Endpoints A and C also establish RTP channels based on port information exchanged in the Fast Connect elements of the setup message sent from endpoint C to endpoint A in 408.

Next in this example, the user at endpoint B decides to patch in a user at endpoint D to create a four-way conference. Accordingly, endpoint B sends a setup request message to endpoint D including the identities of endpoints A and C in the Also parameter (412). In response, endpoint D sends a setup request message to each of endpoints A and C including the identity of endpoint B in the RequestedBy parameter (414 and 416). In response to the invitation from D, endpoints A and C each send back to endpoint D a connect message to form respective connections (418 and 420). Lastly, endpoint D sends a connect message to endpoint B to complete the four-conference (422). For each of the connections A-D, C-D and D-B, corresponding RTP channels are established between the two connecting endpoints based on port information exchanged in the Fast Connect elements of the setup messages that initiated the connections.

Except as otherwise noted, 400-422 generally are time and order independent. Establishing a connection with an endpoint (402, 406, 410, 418, 420, 422) necessarily cannot occur until after the corresponding setup request message has been received from that endpoint (400, 404, 408, 412, 414, 416). However, a joining endpoint generally is free to connect back to the "RequestedBy" endpoint or send a setup request invitation to one or more of the "Also" endpoints in any order desired. For example, endpoint C could have sent the setup request message to endpoint A (408) before, or substantially concurrently with, connecting back to endpoint B (406). Similarly, endpoint D could have connected back to endpoint B (422) at any time after receiving the setup request invitation from endpoint B (412) and need not necessarily have waited until after forming connections with endpoints A and C.

As discussed above, each of the endpoints A, B, C, and D participating in the conference knows, based on the information conveyed by the Also and RequestedBy parameters, to treat the unicast streams received from the other three endpoints as part of the same logical conference, for example, by mixing or otherwise processing the streams and presenting them to an end-user in a format that suggests their inter-relatedness (e.g., overlaid audio streams for voice and/or adjacent display regions for video).

Various implementations of the systems and techniques described here may be realized in digital electronic circuitry, integrated circuitry, specially designed ASICs (application specific integrated circuits) or in computer hardware, firmware, software, or combinations thereof.

Other embodiments may be within the scope of the following claims.

What is claimed is:

1. A method for setting up a distributed multipoint conference among three or more endpoints without requiring centralized control either for signaling or for mixing media streams, the method comprising:

establishing a connection between a plurality of endpoints, including at least a requesting endpoint and one or more other participating endpoints participating in a conference with the requesting endpoint;

initiating a connection from the requesting endpoint to at least a third endpoint, the requesting endpoint identifying to the third endpoint the one or more other participating endpoints participating in the conference with the requesting endpoint, wherein initiating said connection comprises sending an H.323 setup reguest message that includes an identity of the one or more other participating endpoints in a non-standard parameter field of the H.323 message; and the third endpoint directly establishing a connection between itself and the one or more other participating endpoints identified by the requesting endpoint, the third endpoint identifying the requesting endpoint to the one or more other participating endpoints.

2. The method of claim 1 in which the connections between endpoints comprise connections that support unicast streams.

3. The method of claim 1 further comprising at each of the endpoints, mixing streams receiv ed from each of the other endpoints to form a logical conference.

4. The method of claim 1 further comprising, in response to the initiation of the connection from the requesting endpoint, establishing a connection from the third endpoint to the requesting endpoint.

5. The method of claim 1 in which establishing the connection between the third endpoint and the one or more other participating endpoints comprises sending an H.323 setup request message that includes an identity of the requesting endpoint.

6. The method of claim 5 in which sending the H.323 setup request message comprises formatting the H.323 setup request message to include the identity of the requesting endpoint in a non-standard parameter field of the H.323 message.

7. The method of claim 1 in which initiating a connection comprises using a Fast Connect procedure.

8. The method of claim 1 in which the initiating and establishing are repeated to form an N-way conference, where N is an integer greater than three.

9. The method of claim 1 in which initiating a connection to a third endpoint is performed in response to input received from a user of an Internet Protocol telephony application.

10. A method of facilitating a multipoint conference among three or more endpoints, the method comprising:

receiving from a requesting endpoint information comprising an invitation to establish a connection with the requesting endpoint, the invitation identifying one or more other participating endpoints participating in a conference with the requesting endpoint; and directly sending to each of the other participating endpoints identified by the requesting endpoint an invitation to establish a connection and information identifying the requesting endpoint, wherein sending said invitation to each of the other participating endpoints identified by the requesting endpoint comprises sending an H.323 setup request message that identifies the requesting endpoint in a nonstandard parameter field.

11. The method of claim 10 further comprising, in response to receiving an invitation from the requesting endpoint, establishing a connection with the requesting endpoint.

12. The method of claim 11 in which establishing the connection with the requesting endpoint is order independent from sending invitations to each of the other participating endpoints identified by the requesting endpoint.

13. The method of claim 10 in which receiving an invitation from the requesting endpoint comprises receiving an H.323 setup request message that identifies the one or more other participating endpoints in a non-standard parameter field.

14. The method of claim 10 further comprising, in response to sending invitations to the other participating endpoints, receiving from each of the other participating endpoints information establishing a connection.

15. The method of claim 10 further comprising mixing a plurality of unicast streams received from the inviting and other participating endpoints to form a logical conference.

16. The method of claim 15 in which the plurality of unicast streams include voice data or video data or both.

17. The method of claim 10 in which the receiving and sending are performed by an Internet Protocol telephony application.

18. A machine-accessible medium including instructions that, when executed, cause a machine to:

directly receive from an requesting endpoint information comprising an invitation to establish a connection with the requesting endpoint and identifying one or more other endpoints participating in a conference with the requesting endpoint;

directly establish a connection with the requesting endpoint;

directly send to each of the other endpoints identified by the requesting endpoint an invitation to establish a connection and information identifying the requesting endpoint, wherein said invitation comprises instructions to send an H.323 setup request message that identifies the requesting endpoint in a non-standard parameter field;

directly receive from each of the other endpoints information establishing a connection; and mix a plurality of unicast streams received from the inviting and other endpoints to form a logical conference.

19. The machine accessible medium of claim 18 in which the instructions to cause the computer system to receive an invitation from the requesting endpoint comprise instructions to receive an H.323 setup request message that identifies the one or more other endpoints in a non-standard parameter field.

20. The machine accessible medium of claim 18 in which the instructions are performed by an Internet Protocol telephony application.

21. A system comprising:

a user interface configured to receive from a user of the application input identifying one or more endpoints to be called to form a conference and to present a plurality of media streams to the user in a format that suggests inter-relatedness of the streams; and H.323 protocol support for performing the following Internet Protocol (IP) telephony operations:

(i) directly receive from an requesting endpoint information comprising an invitation to establish a connection with the requesting endpoint and identifying one or more other endpoints participating in a conference with the requesting endpoint;

(ii) directly establish a connection with the requesting endpoint;

(iii) directly send to each of the other endpoints identified by the requesting endpoint an invitation to establish a connection and information identifying the requesting endpoint, wherein said invitation comprises instructions to send an H.323 setup request message that identifies the requesting endpoint in a non-standard parameter field;

(iv) directly receive from each of the other endpoints information establishing a connection; and (v) mix a plurality of unicast streams received from the inviting and other endpoints to form a logical conference.

22. The application of claim 21 wherein the application comprises a client configured to be executed on a computer system associated with the user, the client configured to communicate with a remote server application to provide the user with IP telephony functionality.

23. The system of claim 21 wherein, if two or more of the unicast streams comprise audio information, the user interface is configured to overlay the audio streams to suggest inter-relatedness.

24. The system of claim 21 wherein, if two or more of the unicast streams comprise video information, the user interface is configured to display the video streams in adjacent display regions to suggest inter-relatedness.

25. The system of claim 21 in which the H.323 protocol support for receiving an invitation from the requesting endpoint comprises support to receive an H.323 setup request message that identifies the one or more other endpoints in a non-standard parameter field.

* * * * *